United States Patent [19]

Flajnik

[11] 4,230,223

[45] Oct. 28, 1980

[54] PLURAL CABLE CONTAINER CONVEYOR AND TURN THEREFOR

[75] Inventor: Louis Flajnik, Berwyn, Ill.

[73] Assignee: The Continental Group, Inc., Stamford, Conn.

[21] Appl. No.: 940,927

[22] Filed: Sep. 11, 1978

Related U.S. Application Data

[63] Continuation-in-part of Ser. No. 727,069, Sep. 27, 1976, abandoned.

[51] Int. Cl.$^3$ ............................................. B65G 17/00
[52] U.S. Cl. .................................... 198/817; 198/836
[58] Field of Search ............... 198/471, 611, 804, 817, 198/836, 841, 842

[56] References Cited

U.S. PATENT DOCUMENTS

| | | | |
|---|---|---|---|
| 1,476,936 | 12/1923 | Walden | 198/817 |
| 3,666,082 | 5/1972 | Riggs | 198/836 X |

*Primary Examiner*—Robert B. Reeves
*Assistant Examiner*—Douglas D. Watts

*Attorney, Agent, or Firm*—John J. Kowalik; Joseph E. Kerwin; Charles E. Brown

[57] ABSTRACT

A dual cable conveyor and a turn comprising two parallel horiztonally running container-conveying and supporting cables. The cables run in parallel tracks and both simultaneously support the can which straddles the cables. At the turn, an upper and a lower sheave are provided independently rotatable about a common vertical axis. Each sheave has a peripheral groove defined by a narrow upper flange and a wide cable-supporting lower flange. The upper flange is less than the radius of the cable and the lower flange is greater than the radius but smaller than the diameter. The inner cable rides about the upper sheave which is smaller and runs faster than the lower sheave. The inner cable has lengthwise thereof its upper sector tangential to the outer periphery of the upper sheave and therewith supports and advances the cans between appropriately curved inner and outer guide rails. The outer cable disappears below the upper sheave upstream of the entry into the corner and reappears downstream of the exit from the corner into the straight run.

5 Claims, 4 Drawing Figures

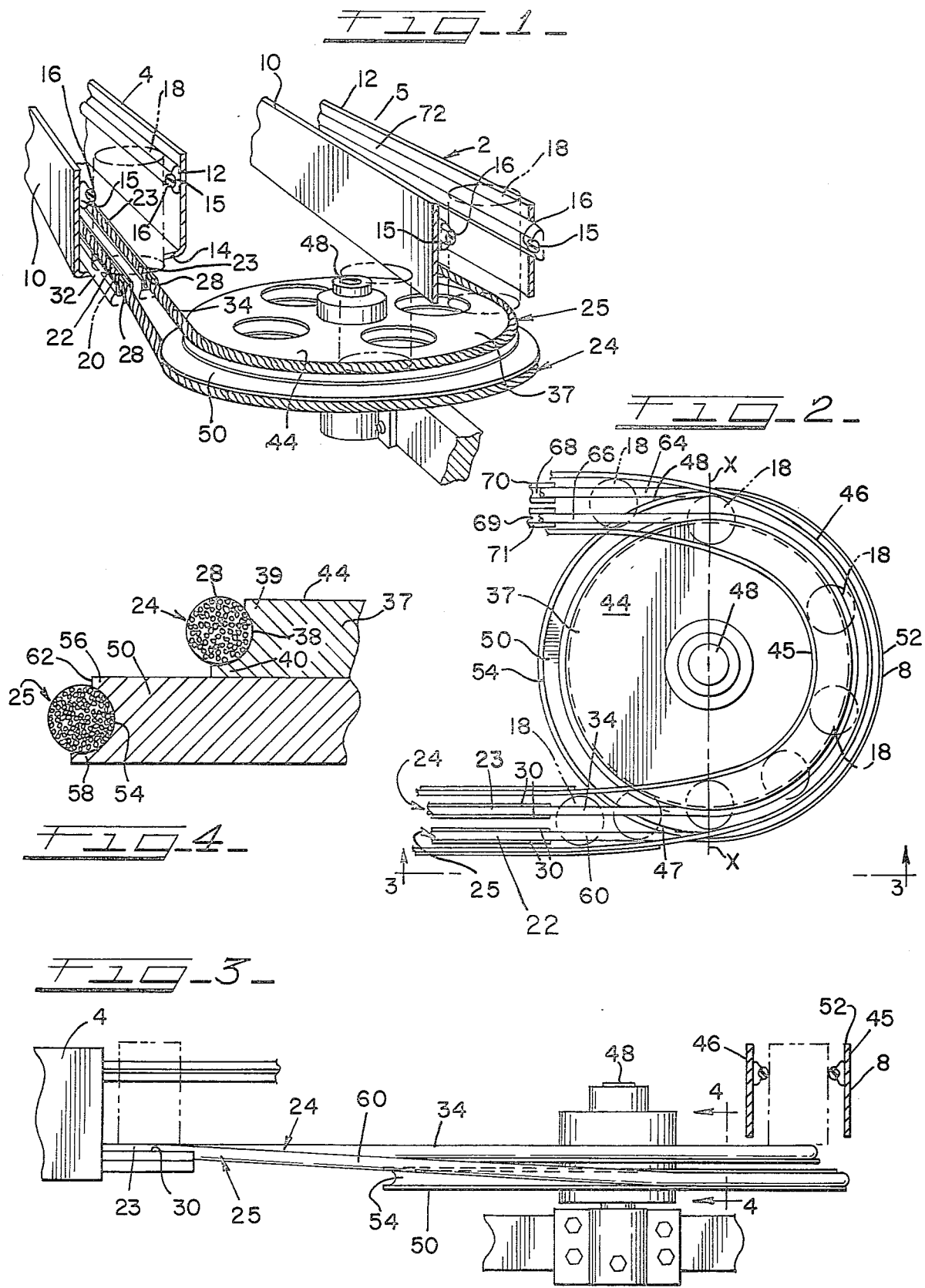

PLURAL CABLE CONTAINER CONVEYOR AND TURN THEREFOR

This application is a continuation-in-part of U.S. application Ser. No. 727,069 filed Sept. 27, 1976 now abandoned.

DISCUSSION

In prior art devices, no simple satisfactory arrangement has been heretofore provided as best known to applicant or moving containers, such as cans, on a cable conveyor about a turn. Various complexities have been used including adding conveying belts and the like to engage the sides of the cans. One problem is that after the cans are printed, the paint has not set and any contact or scuffing along the sides of the cans mars the printing. Furthermore, with cans becoming thinner and thinner each year, care must be taken not to dent or scratch them.

SUMMARY

This invention is directed to a novel plural, preferably dual, cable conveyor particulary adapted for conveying containers, such as cans from station to station.

The invention contemplates providing horizontal runs with grooved tracks supporting in parallel arrangement a pair of cables which have upper can-supporting sectors projecting above the tracks for conveying cans between a pair of flanking side rails.

In particular, the invention has for its object a novel arrangement of plural sheaves and cables in which both of the cables carry the cans in the straight runs and only one of the cables provides support for the cans about a turn which can be even 180° or more in angular displacement.

The invention comprehends providing in the turn for plural cables of a horizontal conveyor progressively larger independently rotatable on a vertical axis, vertically stacked pulleys, the pulleys each having upper and lower flanges defining a cable tracking groove therein, the upper flange being of reduced width so as to permit delivery of the cable into the respective groove transversely of the sheave.

These and other objects and advantages inherent in and encompassed by the invention will become more apparent from the specifications and the drawings, wherein:

FIG. 1 is a perspective view of the invention with parts shown in cross-section;

FIG. 2 is a top plan view thereof;

FIG. 3 is a side elevational view taken essentially on line 3—3 of FIG. 2 with parts broken away and in section; and FIG. 4 is an enlarged fragmentary sectional view taken substantially on line 4—4 of FIG. 3.

DESCRIPTION OF THE INVENTION

The invention is shown in association with a can conveyor generally designated 2 which comprises delivery and discharge sections 4 and 5 and a connecting corner section 8.

The delivery and discharge sections each comprise a trough-like structure having upright side walls 10 and 12 and an intervening horizontal bottom 14. The interior sides of the side walls are provided with longitudinal guide rails 15,15 having plastic strip inserts 16,16 adapted to guide upright cylindrical cans 18 therebetween, the cans each having a bottom end member 20 which straddles a pair of parallel lengths or runs 22,23 of endless conveyor cables 24,25 which are driven from a conventional power source and are laced about sheaves and trained about a motor driven shaft (not shown) with an adequate wrap thereabout as well known to those skilled in the art.

One of the features of the present invention is to provide a pair of cables which have their lengths 22,23 located in a common horizontal plane in the straight runs of the conveyor in parallel arrangement and spaced a distance less than the diameter of the cans seated thereupon and guided between the side rails.

Reference is made to a companion U.S. application filed March 29, 1976 in the name of Russell E. Millspaugh entitled Cable and Side Guide Rails for Can Conveyors, Ser. No. 671,533, now abandoned, in which the disposition of each cable length 22 or 23 within its associated plastic guide strip 26 is disclosed and the disclosure therein is incorporated herein by reference.

In the present application suffice it to say that the upper sectors 28,28 of the cables project slightly above the plane of the upper edges of the side flanges 30 of the U-shaped support and guide strip 32 and simultaneously seat the lower ends 20 of the cans 18 thereupon.

As best seen in FIG. 3, the inner cable 22 has a corner entering inlet section 34 which enters the corner turn 8 coaxially with the section in the straight run portion of the conveyor and wraps about an upper sheave or pulley 37 within its peripheral groove 38 which is defined by upper and lower peripheral flanges 39,40, the lower flange being wider than the top flange and extending radially from the sheave a distance at least equal to the radius of the cable and the upper flange having a radial extent of no more than about one half of the radius of the cable. The arc of the groove as best seen in FIG. 4 is less than 90°—preferably 60-75° maximum whereby the upper sector 28 (FIG. 4) of the cable 24 projects above the horizontal plane of the upper surface 44 of the sheave 37. Thus, the can rides upon the inner cable along length 34 thereof and proceeds between the concentric arcuate turn guide rail sections 45,46 which are spaced apart substantially the diameter of the can. The inner guide rail portion 45 is in the form of an ellipse in plan view and loops about the vertical axis of the journal shaft 48, which independently rotatably mounts the upper sheave 38 and a lower sheave 50 positioned directly therebeneath. It will be seen that the entry and exit portions 47,48 of the turn as defined in part by the guide rails, are chordally laid with respect to the upper pulley and in the bight section 52 are generally closely concentric and in axial alignment with the periphery of the upper flange of the lower sheave.

The lower sheave 50 also has a peripheral groove 54 with upper and lower flanges 56,58, the upper flange 56 being of an extent projecting more than half of the radius of the outer cable but substantially less than the radius whereas the lower flange 58 extends preferably beyond the radius of the outer cable. The arc of the peripheral groove 54 in the lower sheave is preferably about 5° to 10° greater than that of the groove in the upper sheave.

It will be noted from a consideration of FIG. 3 that the outer cable corner entry length 60 slopes downwardly at an angle of about 5-10° with reference to the inner cable below the same and that the depth as well as the radial extent of the upper peripheral flange in the lower sheave are so chosen as to allow the outer cable to ingress into groove 54 with minimal abrasion along the axial edge 62 of the upper flange 56 and to be retained in groove 54 while it travels about the lower sheave approximately 180° whereupon it emerges at its exit length 64 in an upward inclination of between 5° to 10° with respect to the horizontal and proceeds into the horizontal plane coaxial with the exit length 66 of the inner cable respectively into grooves 68,69 of the guide tracks 70,71 of the horizontal straight run 72 of the conveyor.

It will be seen that the outer guide rail corner section 46 subtends the lower sheave and is disposed slightly inwardly of the periphery of the lower flange 58 of the bottom sheave. The corner guide sections 45,46 are so disposed that as the cans pass the transverse diameter X—X, they are gradually shifted off the inner cable and onto the top surface of the top sheave, it being noted that slightly before and after the crest 52 of the curve of the corner more than half of the diameter bottom of the can rests upon the upper surface of the upper sheave. This gradual transition on and off the top of the sheave accommodates accelerating movement of the cans about the corner without tipping and with minimal abrasion of the lithographed sides of the container against the side rails.

It will be appreciated that a novel and effective turn has been disclosed which functions in a high speed delivery system without marring or trembling the containers and that various modifications will now become apparent which are intended to be covered by the appended claims.

What is claimed is:

1. A conveyor for a plural cable conveyor system comprising horizontal straight runs providing horizontally coplanar support surfaces for cans deposited therein and an interconnecting turn, said turn comprising two superposed pulleys including an upper pulley and a lower pulley, each independently rotatable on a common vertical axis;

the upper pulley being of smaller diameter than the lower pulley and having an upper can-supporting surface;

a first conveying cable having a length extending from one of said runs about said upper pulley and into the other straight run and having a sector in the plane of its straight runs projecting above the top surface of the upper pulley for supporting with said top surface of the upper pulley the bottom of a container and carrying it around said turn; and a second cable trained about the lower pulley and coplanar with said first cable in the first run and descending at an acute angle with respect to the plane of the first cable into the turn below the upper pulley and emerging beyond the turn at an acute angle into the plane of said first cable and thereat advancing under the containers exiting from the turn and with said first cable supporting and carrying said containers in the other straight run; and guide means disposed in offcenter relation with respect to said first cable for shifting the containers radially inwardly into said upper pulley in said turn to a position for entire support of the containers solely by the upper pulley and first cable in said turn, said first cable in said turn being disposed radially outwardly of the vertical central axis of said containers, and said first cable protruding slightly above said top surface of the first pulley and supporting said containers in the turn radially outwardly of the central vertical axes of such containers with reference to said axis of rotation of the pulley thereby slightly tilting the containers in the turn toward the axis of rotation of the pulleys, whereby centrifugal forces acting on the containers so tilted tend to bias said containers to upright positions in the turn thereby minimizing the pressure of the contact of the containers with said guide means and thus minimizing or precluding scuffing of any decorative art work or coating on the containers.

2. The invention according to claim 1 and said upper pulley having a peripheral groove admitting a portion of the one cable therein and said groove defined by upper and lower flanges, and said upper flange having a radial extent less than the radius of the cable and exposing an upper sector of said cable above the plane of said upper surface and providing a seating area for the can.

3. The invention according to claim 1 and said lower pulley disposed immediately below the upper pulley and having a peripheral groove admitting said other cable therein and said groove defined by upper and lower radially extending peripheral flanges, the upper flange of the lower pulley being of lesser radial extend than the lower flange on said lower pulley and accommodating transaxial entry and departure of said other cable with respect to the groove in the lower pulley.

4. The invention according to claim 1 and guide means extending above the pulleys at said turn and having inlet portions disposed generally chordally with respect to the pulleys, intermediate portions generally concentric with the pulleys and exit portions disposed chordally with respect to the pulleys.

5. The invention according to claim 1 and said lower pulley being larger than the upper pulley and said pulleys having their grooves tangentially aligned with the lengths of the cables in the one straight run.

* * * * *